(12) United States Patent  
Naito

(10) Patent No.: US 7,436,652 B2  
(45) Date of Patent: Oct. 14, 2008

(54) SOLID ELECTROLYTE CAPACITOR

(75) Inventor: Kazumi Naito, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/579,065

(22) PCT Filed: Nov. 12, 2004

(86) PCT No.: PCT/JP2004/017226

§ 371 (c)(1),  
(2), (4) Date: May 11, 2006

(87) PCT Pub. No.: WO2005/048277

PCT Pub. Date: May 26, 2005

(65) Prior Publication Data

US 2007/0146969 A1  Jun. 28, 2007

Related U.S. Application Data

(60) Provisional application No. 60/523,304, filed on Nov. 20, 2003.

(30) Foreign Application Priority Data

Nov. 13, 2003 (JP) .............................. 2003-383211

(51) Int. Cl.  
*H01G 9/04* (2006.01)  
*H01G 9/145* (2006.01)

(52) U.S. Cl. ...................................... 361/532; 361/528

(58) Field of Classification Search ......... 361/523–529, 361/532  
See application file for complete search history.

(56) References Cited

U.S. PATENT DOCUMENTS 6,333,844 B1 * 12/2001 Nakamura ............... 361/523  
6,352,564 B1 *  3/2002 Araki et al. .............. 29/25.03

FOREIGN PATENT DOCUMENTS

| EP | 0213631 A2 | 3/1987 |
|----|------------|--------|
| JP | 60-37114 A | 2/1985 |
| JP | 6-82592 B2 | 10/1994 |
| JP | 09293647 A * | 11/1997 |
| JP | 11-67602 A | 3/1999 |
| JP | 2001-143968 A | 5/2001 |
| JP | 2003-109850 A | 4/2003 |
| JP | 2003-188052 A | 7/2003 |
| JP | 2003-213302 A | 7/2003 |
| WO | WO 00/75943 A1 | 12/2000 |
| WO | WO02/11932 A1 * | 2/2002 |

* cited by examiner

*Primary Examiner*—Eric Thomas  
(74) *Attorney, Agent, or Firm*—Sughrue Mion, PLLC

(57) ABSTRACT

The present invention relates to a solid electrolyte capacitor having a small size, a high capacitance, a low ESR and an excellent LC value, which includes a jacketed capacitor element obtained by sequentially stacking a dielectric oxide film layer, a semiconductor layer and an electrically conducting layer on a surface of a valve-acting metal sintered body or electrically conducting oxide sintered body connected with an anode lead, wherein the thickness of the semiconductor layer in the vicinity of the anode lead-connection point on the sintered body face connected with an anode lead is 5 μm or less, and also relates to an electronic circuit and electronic device using the capacitor.

13 Claims, 1 Drawing Sheet

SOLID ELECTROLYTE CAPACITOR

CROSS-REFERENCE TO RELATED APPLICATIONS

This is an application filed pursuant to 35 U.S.C. Section 111(a) with claiming the benefit of U.S. provisional application Ser. No. 60/523,304 filed Nov. 20, 2003 under the provision of 35 U.S.C. 111(b), pursuant to 35 U.S.C. Section 119(e)(1).

TECHNICAL FIELD

The present invention relates to a solid electrolyte capacitor having good leakage current (LC) performance.

BACKGROUND ART

Capacitors used in electronic devices such as cellular phone and personal computer are demanded to have a small size, a large capacitance, a low ESR (equivalent series resistance) and high reliability. One of such capacitors is a solid electrolyte capacitor using a sintered body of valve-acting metal or electrically conducting oxide. This solid electrolyte capacitor is produced by connecting an anode lead terminal to a sintered body having fine pores in the inside, forming a dielectric oxide film layer throughout the sintered body surface including pore surfaces, sequentially stacking a semiconductor layer and an electrically conducting layer, and jacketing the obtained capacitor element.

The ESR value is roughly determined by the resistance of the semiconductor layer and the electrically conducting layer and therefore, various designs are being attempted. Particularly, in order to lower the leakage current value (hereinafter simply referred to as an "LC value") caused by the dielectric oxide film, which is a most important factor for reliability, re-electrochemical formation is performed after forming a semiconductor layer, or the produced solid electrolyte capacitor is subjected to aging. Other than these, techniques of improving the semiconductor layer to obtain a low LC value have been proposed. For example, a technique of increasing the thickness of the semiconductor layer formed on the corner areas of the sintered body and thereby decreasing the short circuit failure of the produced capacitor (see, JP-A-13-143968 (the term "JP-A" as used herein means an "unexamined published Japanese patent application")), and a technique of forming a semiconductor layer in a predetermined range (10 to 50 µm) on the surface layer of the sintered body and thereby obtaining a good value for both ESR and LC (see, JP-A-2003-188052) have been proposed.

DISCLOSURE OF THE INVENTION

In producing a solid electrolyte capacitor having a small size and a large capacitance, which is demanded in recent years, a sintered body having a large surface area obtained by using a valve-acting metal or electrically conducting oxide powder having a small particle size is used. In the solid electrolyte capacitor produced by using such a sintered body, it is sometimes difficult to decrease the LC value by a conventional technique such as re-electrochemical formation or aging or even by the above-described newly proposed techniques. Particularly, when producing a large number of solid electrolyte capacitors at the same time, some capacitors produced have a significantly high LC value and it is required to solve this problem and increase the non-defective yield.

As a result of intensive investigations, the present inventors have found that the above-described problem can be solved by not providing a semiconductor layer in the vicinity of the anode lead-connection point (in the range of 0.5 mm, at least 0.2 mm from the lead) on the sintered body surface connected with an anode lead or if providing a semiconductor layer, by specifying the thickness of the semiconductor layer to a predetermined thickness (5 µm or less). The present invention has been accomplished based on this finding.

That is, the present invention relates to the following solid electrolyte capacitor and electronic device using the solid electrolyte capacitor.

1. A solid electrolyte capacitor comprising a jacketed capacitor element, the capacitor element being obtained by sequentially stacking a dielectric oxide film layer, a semiconductor layer and an electrically conducting layer on a surface of a valve-acting metal sintered body or electrically conducting oxide sintered body connected with an anode lead, wherein the thickness of the semiconductor layer in the vicinity of the anode lead-connection point on the sintered body surface connected with an anode lead is 5 µm or less.

2. The solid electrolyte capacitor as described in 1 above, wherein the semiconductor layer is not provided in the vicinity of the anode lead-connection point on the sintered body surface connected with an anode lead.

3. The solid electrolyte capacitor as described in 1 or 2 above, wherein the thickness of the semiconductor layer in the portion excluding the vicinity of the anode lead-connection point is from 5 to 100 µm.

4. The solid electrolyte capacitor as described in any one of 1 to 3 above, wherein the valve-acting metal or electrically conducting oxide is tantalum, aluminum, niobium, titanium, an alloy mainly comprising such a valve-acting metal, or niobium oxide.

5. The solid electrolyte capacitor as described in any one of 1 to 4 above, wherein the valve-acting metal sintered body is a tantalum sintered body having a CV of 100,000 µF·V/g or more.

6. The solid electrolyte capacitor as described in any one of 1 to 4 above, wherein the valve-acting metal sintered body is a niobium sintered body having a CV of 150,000 µF·V/g or more.

7. The solid electrolyte capacitor as described in any one of 1 to 4 above, wherein the semiconductor layer is at least one member selected from an organic semiconductor layer and an inorganic semiconductor layer.

8. The solid electrolyte capacitor as described in 7 above, wherein the organic semiconductor is at least one member selected from the group consisting of an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

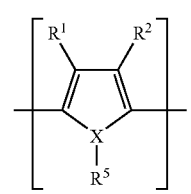

(1)

-continued

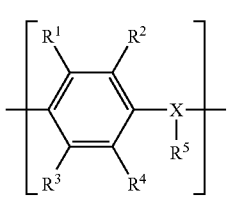

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs $R^1$ and $R^2$, and $R^3$ and $R^4$ may combine with each other to form a ring.

9. The solid electrolyte capacitor as described in 8 above, wherein the electrically conducting polymer containing a repeating unit represented by formula (1) is an electrically conducting polymer containing a structure unit represented by the following formula (3) as a repeating unit:

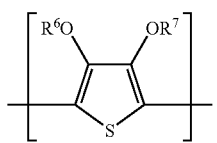

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

10. The solid electrolyte capacitor as described in 8 above, wherein the electrically conducting polymer is selected from the group consisting of polyaniline, polyoxyphenylene, polyphenylene sulfide, polythiophene, polyfuran, polypyrrole, polymethylpyrrole, and substitution derivatives and copolymers thereof.

11. The solid electrolyte capacitor as described in 9 or 10 above, wherein the electrically conducting polymer is poly (3,4-ethylenedioxythiophene).

12. The solid electrolyte capacitor as described in 7 above, wherein the inorganic semiconductor is at least one compound selected from the group consisting of molybdenum dioxide, tungsten dioxide, lead dioxide and manganese dioxide.

13. The solid electrolyte capacitor as described in 7 above, wherein the electrical conductivity of the semiconductor is from $10^{-2}$ to $10^3$ S/cm.

14. An electronic circuit using the solid electrolyte capacitor described in any one of 1 to 13 above.

15. An electronic device using the solid electrolyte capacitor described in any one of 1 to 13 above.

DETAILED DESCRIPTION OF INVENTION

Figure 1:
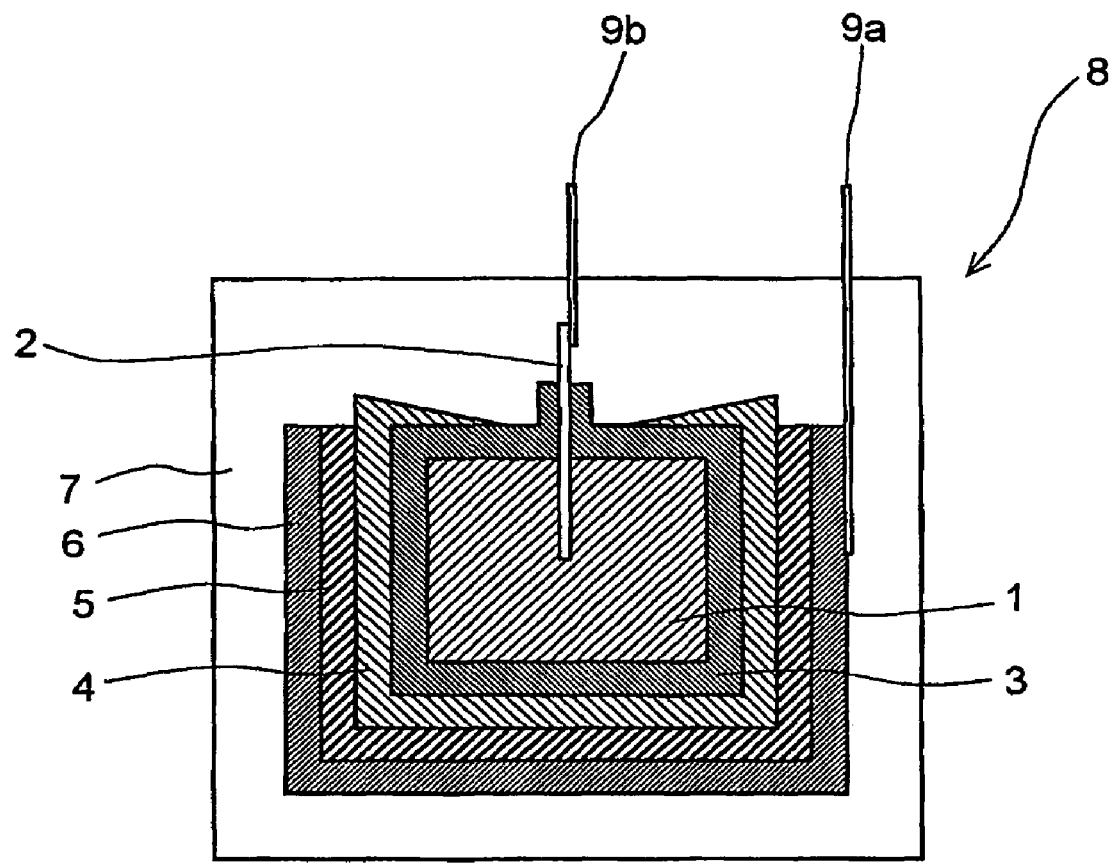
FIG. 1 is a cross-sectional view showing one example of the solid electrolyte capacitor of the present invention.

One embodiment of the solid electrolyte capacitor of the present invention is described by referring to the drawing attached.

FIG. 1 is a cross-sectional view showing one example of the solid electrolyte capacitor of the present invention (in FIG. 1, the size of each part is exaggeratedly shown for facilitating the description).

An anode lead 2 is implanted in a sintered body 1 comprising a valve-acting metal or electrically conducting oxide powder, a dielectric oxide film 3 is formed on a part of the anode lead and on the sintered body surface (although not shown in FIG. 1, the dielectric oxide film layer is formed also on the surface inside the pore of sintered body), a semiconductor layer 4, a carbon paste layer 5 and a silver paste layer 6 are sequentially stacked on the sintered body in the portion excluding the vicinity of the anode lead implanted point on the face implanted with the anode lead, the resulting solid electrolyte capacitor element is connected to each of cathode and anode terminals 9a and 9b, and a jacket 7 is applied thereto excluding a part of the cathode and anode terminals, whereby a solid electrolyte capacitor 8 is produced.

The sintered body for use in the present invention is produced by sintering a molded article of a valve-acting metal or electrically conducting oxide powder which has an anode lead implanted on the surface. By appropriately selecting the molding pressure (for example, from 0.1 to 50 kg/mm²) and the sintering conditions (for example, a temperature of 800 to 1,800° C. and a sintering time of 1 minute to 10 hours), the surface area of the sintered body can be increased. In order to further increase the surface area of the sintered body, the sintered body surface may be subjected to chemical and/or electrical etching treatment after the sintering.

The shape of the sintered body for use in the present invention is not particularly limited. The sintered body is usually pillar-shaped and in the case of a square pillar shape, at least one of the corners may be chamfered or rounded off to give a good average leakage current (LC) value of the solid electrolyte capacitor produced by using the sintered body. Also, the sintered body may be tapered to facilitate the release of the molded article from the die after the molding. In this case, the sintered body produced has a nearly truncated pyramid shape.

In the present invention, the anode lead may be a lead wire or a lead foil. Also, the anode lead may be connected after the production of the sintered body instead of implanting it in the molded article. The material for the anode lead is tantalum, aluminum, niobium, titanium or an alloy mainly comprising such a valve-acting metal. A part of the anode lead before use may be subjected to at least one treatment selected from carbidation, phosphation, boronation, nitridation, sulfidation and oxidation.

In the case of implanting the anode lead in the molded article, the implant depth of the anode lead implanted in the sintered body is ⅓ or more, preferably ⅔ or more, of the sintered body, so that the sintered body can maintain its strength and can endure the thermal/physical sealing stress at the step of jacketing and sealing the capacitor element, which is described later.

In order to prevent a semiconductor layer or an electrically conducting layer from splashing up at the time of its formation and attaching to the upper part of the lead wire to cause short-circuit of the capacitor, an insulating resin may be attached like a headband onto the boundary (on the anode lead side) between the sintered body and the anode lead to insulate the anode lead.

The valve-acting metal or electrically conducting oxide includes tantalum, aluminum, niobium, titanium, an alloy mainly comprising such a valve-acting metal, niobium oxide and a mixture of two or more members selected from these valve-acting metals, alloys and electrically conducting oxides.

The valve-acting metal or electrically conducting oxide used in the present invention is usually in powder form.

A part of the valve-acting metal, alloy, electrically conducting compound, sintered body or the like before use may be subjected to at least one treatment selected from carbidation, phosphation, boronation, nitridation, sulfidation and oxidation.

The solid electrolyte capacitor of the present invention is produced by sequentially stacking a dielectric oxide film layer, a semiconductor layer and an electrically conducting layer on the sintered body to form a cathode part, connecting a part of the anode lead of the resulting solid electrolyte capacitor element and a part of the cathode part with an anode terminal and a cathode terminal respectively, and jacketing and sealing the capacitor element excluding a part of each of the cathode and anode terminals.

The dielectric oxide film layer formed on the surface of the sintered body of the present invention and on a partial surface of the anode lead includes a dielectric layer mainly comprising at least one member selected from metal oxides such as $Ta_2O_5$, $Al_2O_3$, $TiO_2$ and $Nb_2O_5$. This dielectric layer can be obtained by electrochemically forming the sintered body in an electrolytic solution. A dielectric layer obtained by mixing a dielectric layer mainly comprising at least one member selected from metal oxides and a dielectric layer for use in ceramic capacitors may also be used (see, International Publication No. WO00/75943).

A representative example of the semiconductor layer formed on the dielectric layer of the present invention is at least one compound selected from an organic semiconductor and an inorganic semiconductor.

Specific examples of the organic semiconductor include an organic semiconductor mainly comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

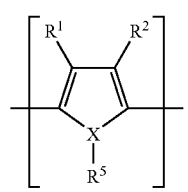
(1)

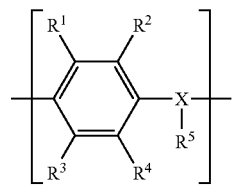
(2)

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs $R^1$ and $R^2$, and $R^3$ and $R^4$ may combine with each other to form a ring.

The electrically conducting polymer containing a repeating unit represented by formula (1) for use in the present invention is preferably an electrically conducting polymer containing a structure unit represented by the following formula (3) as a repeating unit:

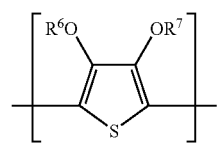
(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position. The ring structure includes a structure having a vinylene bond which may be substituted, and a phenylene structure which may be substituted.

The electrically conducting polymer containing such a chemical structure is being electrically charged and a dopant is doped therein. For the dopant, known dopants can be used without limitation.

Examples of the polymer containing a repeating unit represented by formula (1), (2) or (3) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

Specific examples of the inorganic semiconductor include at least one compound selected from molybdenum dioxide, tungsten dioxide, lead dioxide and manganese dioxide.

When the organic or inorganic semiconductor used has an electrical conductivity of $10^{-2}$ to $10^3$ S/cm, preferably from $10^0$ to $10^3$ S/cm, the capacitor produced can have a small ESR value and this is preferred.

The semiconductor layer may be formed by a conventionally known method such as a method of forming the semiconductor layer by electrolytic polymerization (see, JP-A-60-37114), a method of electrolytically polymerizing an anode substrate treated with an oxidizing agent (Japanese Patent No.

2,054,506) and a method of chemically depositing the semiconductor layer (Japanese Patent No. 2,044,334 (European Patent No.213631)).

Also, a re-electrochemical forming operation may be performed during the process of and/or after the formation of semiconductor layer so as to repair fine defects of the dielectric oxide layer, which are generated as a result of formation of the semiconductor layer.

In the present invention, it is important that in the vicinity of the anode lead-connection point on the sintered body surface connected with an anode lead, the semiconductor layer is formed to a thickness of 5 μm or less, preferably not formed. When this formation method for the semiconductor layer in the vicinity of the anode lead-connection point is applied to the case of producing a large number of solid electrolyte capacitor elements at the same time, the generation rate of solid electrolyte capacitors having a significantly high LC value can be decreased.

In the vicinity of the anode lead-connection point, no semiconductor layer is formed. Alternatively, for example, a semiconductor layer may be formed on the face on which an anode lead is implanted in such a manner that the semiconductor layer may be tapered to form a slope from the edges of the face toward the anode lead-connection point, that is, the thickness of the semiconductor layer may become smaller toward the anode lead-connection point, as shown in the cross-sectional view of FIG. 1. Such a process of forming a semiconductor layer can be achieved by strictly controlling the conditions (dipping part and number of times to repeat the dipping) in dipping the sintered body having formed on the surface thereof the dielectric layer in a semiconductor layer-forming solution. More specifically, for example, in order to adjust the thickness of the semiconductor layer as desired, the dipping operation for forming the semiconductor layer on the dielectric oxide film layer may be repeated fewer times in the vicinity of the anode lead-connection point than in the other parts of the dielectric oxide film.

The face of the sintered body where the anode lead is connected is a portion where materials differing in the kind and shape joint and bear a stress at the connection and therefore, the dielectric oxide film layer formed in this portion is unstable. It is assumed that recovery of the LC value is difficult if the semiconductor layer attached to this portion permeates into the unstable dielectric oxide film layer.

Also, with respect to valve-acting metal or electrically conducting oxide powder used as material for the sintered body, the smaller the particle size is, the shorter the radius of curvature of the dielectric oxide film layer, as a result, the dielectric oxide layer film becomes greatly unstable and a large LC value generally occurs. However, even if such a sintered body is used, the LC value of the solid electrolyte capacitor can be satisfactorily lowered by employing the aforementioned method of the present invention, and the generation rate of defective elements can be decreased. That is, according to the present invention, the smaller the particle size of the material for the sintered body (i.e. the larger the CV of the powder), the greater the effect of the invention. For example, the present invention is effective when applied to a sintered body of tantalum metal powder material which has a CV value (product of capacitance and electrochemical voltage as measured with an electrolytic solution) of 100,000 μF·V/g or more, and also effective when applied to a sintered body of niobium metal powder material which has a CV value of 150,000 μF·V/g or more in the case of a sintered body.

In the present invention, the thickness of the semiconductor layer in the portion excluding the vicinity of the anode lead-connection point is from 5 to 100 μm, preferably from 10 to 50 μm. By specifying as above the thickness of the semiconductor layer in the vicinity of the anode lead-connection point and thickness in the portion excluding the vicinity of the anode lead-connection point, the generation rate of solid electrolyte capacitors having a significantly high LC value can be decreased at the time of simultaneously producing a large number of solid electrolyte capacitor elements.

In the solid electrolyte capacitor of the present invention, an electrically conducting layer is provided on the semiconductor layer formed by the above-described method or the like, so as to attain good electrical contact with an external outgoing lead (for example, lead frame) of the capacitor.

The electrically conducting layer may be formed, for example, by solidification of electrically conducting paste, plating, vapor deposition of metal, or lamination of heat-resistant electrically conducting resin film.

Preferred examples of the electrically conducting paste include silver paste, copper paste, aluminum paste, carbon paste and nickel paste, and these may be used individually or in combination of two or more thereof. In the case of using two or more pastes, the pastes may be mixed or may be superposed one on another as separate layers. The electrically conducting paste applied is then solidified by allowing it to stand in air or under heating.

The electrically conducting paste mainly comprises a resin and an electrically conducting powder such as metal and depending on the case, a solvent for dissolving the resin, a hardening agent for the resin, and the like are added, but the solvent is dissipated at the solidification.

As for the resin, various known resins such as alkyd resin, acryl resin, epoxy resin, phenol resin, imide resin, fluororesin, ester resin, imidamide resin, amide resin, styrene resin and urethane resin can be used.

As for the electrically conducting powder, at least one of a powder of silver, copper, aluminum, gold, carbon, nickel or an alloy mainly comprising such a metal, a coated powder having such a metal on the surface layer, and a mixed powder thereof is used.

The electrically conducting powder is usually contained in an amount of 40 to 97 mass %. If the content is less than 40 mass %, the produced electrically conducting paste is low in the electrical conducting property, whereas if it exceeds 97 mass %, the electrically conducting paste disadvantageously causes adhesion failure. For the electrically conducting powder, an electrically conducting powder having an arbitrary average particle size of 0.1 to 50 μm and a spherical particle form or a flat (flake) particle form, or a mixed powder thereof can be used. Examples of such a silver powder include SIL-COAT (trade name, produced by Fukuda Metal Foil Powder Co., Ltd.). In the electrically conducting paste, a powder of the above-described electrically conducting polymer or metal oxide for forming the semiconductor layer can be mixed in. The electrically conducting paste is usually stacked on the semiconductor layer to a thickness of 1 to 200 μm, preferably from 10 to 100 μm, per one layer.

Examples of the plating include nickel plating, copper plating, silver plating, aluminum plating and gold plating. Examples of the metal vapor-deposited include aluminum, nickel, copper, silver and gold.

On the sintered body surface connected with an anode lead, an electrically conducting layer may or may not be formed, but when an electrically conducting layer is formed, despite good ESR, the produced solid electrolyte capacitor tends to be worsened in the LC value.

Specifically, for example, a carbon paste and a silver paste are stacked in this order to form an electrically conducting layer on the electrical conductor having formed thereon the semiconductor layer.

In this way, a capacitor element where a cathode part is formed by stacking layers up to the electrode layer is fabricated.

The capacitor element of the present invention having such a constitution is jacketed, for example, with resin mold, resin case, metallic jacket case, resin dipping or laminate film and thereby can be completed as a capacitor product for various uses. Among these, a chip capacitor jacketed with resin mold is preferred, because reduction in the size and the cost can be simply attained.

The jacketing by resin mold is specifically described below. A part of the electrically conducting layer of the above-described capacitor element is laid on one end part of a separately prepared lead frame having a pair of oppositely disposed end parts, a part of the anode lead (the end of the anode lead may be cut to adjust the size) is laid on the other end part of the lead frame, the respective parts and the end parts of the lead frame are electrically or mechanically joined, for example, by solidification of an electrically conducting paste for the former and by welding for the latter, the entirety is mold-sealed with a resin while leaving out a part of the lead frame end, and the lead frame is cut and bent at predetermined portions outside the resin jacket, whereby the capacitor of the present invention is produced. When the lead frame is present on the bottom surface of the resin jacket and the bottom surface or bottom and side surfaces of the lead frame are kept unsealed, only cutting of the lead frame may be sufficient.

The lead frame is proccessed as described above and finally works out to external terminals of the capacitor. The lead frame is in a foil or tabular form and the construction material is iron, copper, aluminum or an alloy mainly comprising such a metal. The lead frame may be partially or entirely plated with solder, tin, titanium, gold, silver or the like. Between the lead frame and the plating, a primer plating such as nickel or copper may be provided.

The lead frame may be subjected to various platings after or before being processed. It is also possible to plate the lead frame before laying thereon an capacitor element and connecting therewith, and apply re-plating at an arbitrary time after the molding. For example, for the purpose of facilitating connection, the lead frame may be subjected to partial plating on at least the portion to which the anode lead is to be connected, and after the capacitor element is connected and mold-sealed, the whole lead frame may be subjected to plating.

The lead frame has a pair of oppositely disposed end parts and by virtue of a gap between the end parts, the anode part and the cathode part of each capacitor element can be insulated from each other.

With respect to the resin used for resin mold jacketing, known resins for use in molding of a solid electrolyte capacitor, such as epoxy resin, phenol resin and alkyd resin, can be employed. A resin having a low-stress resin as those generally available on the market is preferably employed, since the molding stress on the capacitor element, which is generated at the molding, can be mitigated. The production machine used for performing the molding with resin is preferably a transfer machine.

The thus-produced capacitor may be subjected to an aging treatment so as to repair the thermal and/or physical deterioration of the dielectric layer, which is generated at the formation of electrically conducting layer or at the jacketing.

The aging is performed by applying a predetermined voltage (usually, within 2 times the rated voltage) to the capacitor. The optimal values of aging time and temperature vary depending on the kind, capacitance and rated voltage of capacitor and therefore, these values are determined by previously performing an experiment. Usually, the aging time is from several minutes to several days and the aging temperature is 300° C. or less by taking account of heat deterioration of the voltage-applying jig. The aging may be performed in an air atmosphere or in a gas atmosphere such as Ar, $N_2$ or He and may be performed under reduced pressure, atmospheric pressure or applied pressure. When the aging is performed while or after supplying water vapor, the stabilization of dielectric layer sometimes proceeds. The aging may also be performed after supplying water vapor and then allowing the capacitor to stand at a high temperature of 150 to 250° C. for several minutes to several hours to remove excess water. Furthermore, the capacitor after aging may be left standing at 150 to 250° C. for several minutes to several hours to remove excess water. Examples of the method for supplying water vapor include a method of supplying water vapor from a water reservoir placed in the aging furnace by using the heat.

As for the method of applying a voltage, an arbitrary current such as direct current, alternating current having an arbitrary waveform, alternating current superposed on direct current, and pulse current can be designed to pass. It is also possible to once stop the application of voltage during the aging process and again apply a voltage.

The capacitor produced in the present invention can be preferably used for circuits requiring a high-capacitance capacitor, such as central processing circuit and power source circuit. These circuits can be used in various digital devices such as personal computer, server, camera, game machine, DVD, AV equipment and cellular phone, and electronic devices such as various power sources. The solid electrolyte capacitor produced in the present invention has a large capacitance and a good ESR value and causes no significantly defective LC value and therefore, by using this capacitor, electronic circuits and electronic devices having high reliability can be obtained.

BEST MODE FOR CARRYING OUT THE INVENTION

The present invention is described in greater detail below by referring to Examples, but the present invention is not limited to these Examples.

EXAMPLE 1

By using and shaping a niobium powder having CV (product of capacitance and electrochemical voltage) of 200,000 µF·V/g together with a niobium lead wire of 0.29 mmφ, a sintered body in a size of 4.5×3.0×1.0 mm was produced (nitrided amount of the powder: 11,000 ppm, amount of oxygen due to natural oxidation on the powder surface: 80,000 ppm, sintering temperature: 1,270° C., sintering time: 30 minutes, density of sintered body: 3.6 g/cm³, an Nb lead wire was vertically implanted in the center part of the 1.0×3.0 mm face of the sintered body while implanting the lead 4 mm deep inside the sintered body with 10 mm of the lead protruding outside the sintered body). The lead wires having the same dimension of 32 sintered bodies prepared above were arrayed and connected at regular intervals on a separately prepared stainless steel-made long metal plate having a length of 250 mm, a width of 20 mm and a thickness of 2 mm while leaving the 30 mm margins unused in the right and left edges. Subsequently, 20 sheets of such long metal plates were arrayed in parallel at intervals of 5 mm and provided on a metal-made frame such that the long metal plates were electrically connected with each other at positions of 15 mm in the left and right sides. On the metal-made frame, 640 sintered bodies were disposed at regular intervals and each sintered body was electrically connected through the lead wire to a power supply terminal provided on the metal-made frame. This metal-made frame having laid thereon these sintered bodies was taken as 1 lot and subjected to the following various operations.

The sintered body except for a part of the lead wire was dipped in an aqueous 1% phosphoric acid solution (for the purpose of alleviating evaporation of water from the solution, a film sheet was superposed on the solution surface, and the film sheet had 20 slits of 200 mm long and 1.5 mm wide so that the 640 sintered bodies could be dipped in the solution) and electrochemically formed at 80° C. for 10 hours by applying 20 V between the lead wire which served as an anode and a Ta cathode plate disposed in the aqueous solution to form a dielectric oxide film layer mainly comprising $Nb_2O_5$. The resulting sintered body except for the face implanted with the lead wire was dipped in a 1:1 mixed solution of an aqueous 5% lead acetate solution and an aqueous 10% ammonium persulfate solution, left standing at 40° C. for 1 hour, then pulled up, washed with water, dried and washed with an aqueous 15% ammonium acetate solution, and by repeating this operation 7 times, fine deposits comprising a mixture of lead dioxide and lead acetate (lead dioxide: 96%) were formed on the dielectric oxide film layer. During formation process of the fine deposits and in the last, re-electrochemical formation in an aqueous 0.1% acetic acid solution at 80° C. and 18 V for 40 minutes was performed multiple times. Thereafter, the sintered body except for the face implanted with the lead wire was dipped in an electrolytic solution comprising water and 20% ethylene glycol, where ethoxydioxythiophene (used as an aqueous solution with a saturated monomer concentration or less) and anthraquinonesulfonic acid were dissolved, and a direct constant current of 20 mA was passed for 45 minutes between the lead wire and a negative tantalum electrode plate disposed in the electrolytic solution from a power supply terminal on the metal-made frame, thereby performing electrification for forming a semiconductor layer. The sintered body was then pulled up, washed, dried and subjected to re-electrochemical formation (80° C., 30 minutes, 17 V) for repairing fine LC defects of the dielectric layer in an aqueous 1% acetic acid solution. The step including electrification followed by re-electrochemical formation was repeated 15 times. Subsequently, the sintered body was washed with water and dried to form a semiconductor layer (20 μm). Furthermore, a carbon paste, and a silver paste comprising 10 parts by mass of acrylic resin and 90 parts by mass of silver powder were stacked in this order on the semiconductor layer except for the face on which the lead wire was implanted, to provide an electrically conducting layer and thereby complete the cathode part. In this way, a solid electrolyte capacitor element was produced.

On upper surfaces of a pair of end parts of a separately prepared 100 μm-thick copper alloy lead frame (32 paired end parts each having a width of 3.4 mm were present and when a pair of end parts was coplanarly projected, the gap between the end parts was of 1.0 mm) with the surface being plated with tin, laid were the cathode part face (face of 4.5 mm×3.0 mm) and the anode lead wire which was partially cut and removed, of each solid electrolytic capacitor element produced above. Then, the former was electrically or mechanically connected by solidification of the same silver paste as used in the cathode part, and the latter was connected by spot-welding. The resulting capacitor element was jacketed with epoxy resin by transfer molding while leaving a part of the lead frame outside the jacket, and the lead frame outside the resin jacket was cut at a predetermined position and then bent along the jacket part. Subsequently, the jacket resin was cured at 180° C. and the capacitor obtained was subjected to aging at 85° C. and 9 V for 4 hours to produce a chip solid electrolyte capacitor in a size of 7.3×4.3×1.8 mm.

EXAMPLE 2

A chip solid electrolyte capacitor where the thickness of the semiconductor layer in the vicinity of the lead wire-implanted part was 2 μm was produced in the same manner as in Example 1 except that the formation of fine deposits was conducted on the surface including the face implanted with the lead wire and that out of the 15 repetitions of the step for forming the semiconductor layer, 5 repetitions were performed on the whole surface of the sintered body including the face implanted with the lead wire.

EXAMPLE 3

A chip solid electrolyte capacitor where the thickness of the semiconductor layer in the vicinity of the lead wire-implanted part was 5 μm was produced in the same manner as in Example 1 except that the formation of fine deposits was conducted also on the face implanted with the lead wire and that out of the repetitions of the step for forming the semiconductor layer, 7 repetitions were performed on the whole surface of the sintered body including the face implanted with the lead wire.

COMPARATIVE EXAMPLE 1

A chip solid electrolyte capacitor was produced in the same manner as in Example 2 except that all 15 repetitions of the formation process of the semiconductor layer included the face implanted with the lead wire of the sintered body.

EXAMPLE 4

A chip solid electrolyte capacitor where the thickness of the semiconductor layer in the portion excluding the face implanted with the lead wire was 80 μm was produced in the same manner as in Example 1 except that after the formation of the semiconductor layer, the re-electrochemical formation was repeated 2 times under the same conditions by passing a direct constant current of 40 mA for 30 minutes.

COMPARATIVE EXAMPLE 2

A chip solid electrolyte capacitor was produced in the same manner as in Example 1 except that the formation of fine deposits was conducted also on the face implanted with the lead wire, that out of the repetitions of the step for forming the semiconductor layer, 9 repetitions were performed on the whole surface of the sintered body including the face implanted with the lead wire, and that after the formation of the semiconductor, re-electrochemical formation was repeated 6 times under the same conditions by passing a direct constant current of 40 mA for 30 minutes to overall form a semiconductor layer having a thickness of 110 μm.

EXAMPLE 5

A chip solid electrolyte capacitor where a semiconductor layer of 30 μm was formed in the portion excluding the face implanted with the lead wire, was produced in the same manner as in Example 1 except that the sintered body (sintering temperature: 1,300° C., sintering time: 20 minutes, density of sintered body: 6.1 g/cm$^3$) was produced by using a tantalum powder having a CV of 90,000 μF·V/g and a tantalum wire of 0.24 mmφ in place of the niobium powder and the niobium lead wire, that a dielectric layer comprising $Ta_2O_5$ was formed by setting the formation voltage to 9 V, that the re-electrochemical formation during the formation process of fine deposits and in the last was performed at 8 V, and that the re-electrochemical formation during the formation process of semiconductor layer and in the last was performed at 7 V.

The capacitors produced in Examples 1 to 5 and Comparative Examples 1 and 2 were measured (4 units of the capacitor in each Example were measured) on the average thickness of the semiconductor layer in the vicinity of the anode lead-connection point on the sintered body surface and the average thickness of the semiconductor layer in the portion excluding the vicinity of the anode lead-connection point, and 636 units of the capacitor in each Example were measured on the average capacitance, ESR and LC, by the following methods. Each measured value and the number of units showing an LC value of 1,000 μA or more are shown together in Table 1.

Average Thickness of Semiconductor Layer in the Vicinity of Anode Lead-connection Point and Average Thickness of Semiconductor in the Portion Excluding the Vicinity of the Anode Lead-connection Point:

A cross section parallel to the 4.5×1.0 mm face of the sintered body was photographed at a magnification of 2,000 times through an electron microscope and the most frequent thickness value was employed.

Capacitance:

The capacitance was measured at room temperature and 120 Hz by using an LCR measuring meter manufactured by Hewlett Packard, Ltd.

ESR:

The equivalent series resistance of capacitor was measured at 100 kHz.

LC Value:

The LC value was measured after a predetermined rated voltage (2.5 V in Example 5 and 4 V in the other Examples and Comparative Examples) was continuously applied between terminals of the produced capacitor at room temperature for 30 seconds.

TABLE 1

|  |  | Thickness of Semiconductor Layer | | | | | |
|---|---|---|---|---|---|---|---|
|  |  | Vicinity of Lead (μm) | Portion Excluding Sintered Body Surface Implanted with Lead Wire (μm) | Capacitance (μF) | ESR (mΩ) | LC* (μA) | Number of Units with LC Exceeding 1,000 μA |
| Example | 1 | 0 | 20 | 365 | 30 | 31 | 1/636 |
|  | 2 | 2 | 20 | 370 | 33 | 34 | 2/636 |
|  | 3 | 5 | 20 | 375 | 33 | 38 | 3/636 |
|  | 4 | 0 | 80 | 367 | 42 | 30 | 2/636 |
|  | 5 | 0 | 30 | 640 | 18 | 18 | 0/636 |
| Comparative Example | 1 | 20 | 20 | 378 | 34 | 39 | 7/636 |
|  | 2 | 8 | 110 | 375 | 55 | 36 | 6/636 |

*An average value of capacitors excluding those having an LC value exceeding 1,000 μA.

As seen from data comparison between Examples and Comparative Examples in Table 1, when the thickness of the semiconductor layer in the vicinity of the anode lead-connection point on the face connected with an anode lead in the sintered body surface is 5 μm or less, the generation rate of solid electrolyte capacitors having an extremely large LC value decreases.

INDUSTRIAL APPLICABILITY

The present invention provides a solid electrolyte capacitor characterized in that the thickness of the semiconductor layer in the vicinity of the anode lead-connection point on the face connected with an anode lead in the sintered body surface is 5 μm or less. According to the present invention, the generation rate of solid electrolyte capacitors having an extremely large LC value can be decreased.

The invention claimed is:

1. A solid electrolyte capacitor comprising a jacketed capacitor element, the capacitor element being obtained by sequentially stacking a dielectric oxide film layer, a semiconductor layer and an electrically conducting layer on a surface of a valve-acting metal sintered body or electrically conducting oxide sintered body connected with an anode lead, wherein the thickness of the semiconductor layer in the vicinity of the anode lead-connection point on the sintered body surface connected with an anode lead is 5 μm or less, the thickness of the semiconductor layer in the portion excluding the vicinity of the anode lead-connection point is from 5 to 100 μm and the semiconductor layer is not present in a thickness of greater than 5 μm at a distance of at least 0.2 mm from the anode lead-connection point on the sintered body surface, and wherein the valve-acting metal sintered body is a tantalum sintered body having a CV of 100,000 μF·V/g or more or a niobium sintered body having a CV of 150,000 μF·V/g or more.

2. The solid electrolyte capacitor as claimed in claim 1, wherein the semiconductor layer is not provided in the vicinity of the anode lead-connection point on the sintered body surface connected with an anode lead.

3. The solid electrolyte capacitor as claimed in claim 1, wherein the electrically conducting oxide is niobium oxide.

4. The solid electrolyte capacitor as claimed in claim 1, wherein the semiconductor layer is at least one member selected from an organic semiconductor layer and an inorganic semiconductor layer.

5. The solid electrolyte capacitor as claimed in claim 4, wherein the organic semiconductor is at least one member selected from the group consisting of an organic semiconductor comprising benzopyrroline tetramer and chloranil, an organic semiconductor mainly comprising tetrathiotetracene, an organic semiconductor mainly comprising tetracyano-quino-dimethane, and an organic semiconductor mainly comprising an electrically conducting polymer obtained by doping a dopant to a polymer containing a repeating unit represented by the following formula (1) or (2):

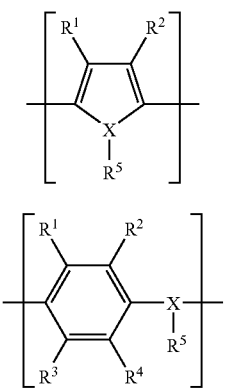

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs $R^1$ and $R^2$, and $R^3$ and $R^4$ may combine with each other to form a ring.

6. The solid electrolyte capacitor as claimed in claim 5, wherein the electrically conducting polymer containing a repeating unit represented by formula (1) is an electrically conducting polymer containing a structure unit represented by the following formula (3) as a repeating unit:

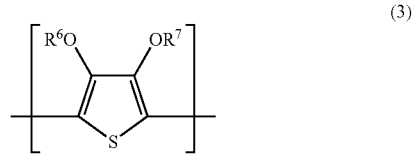

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position, and the cyclic structure includes a structure having a vinylene bond which may be substituted, and a phenylene structure which may be substituted.

7. The solid electrolyte capacitor as claimed in claim 6, wherein the electrically conducting polymer is poly(3,4-ethylenedioxythiophene).

8. The solid electrolyte capacitor as claimed in claim 5, wherein the electrically conducting polymer is selected from the group consisting of polyaniline, polyoxyphenylene, polyphenylene sulfide, polythiophene, polyfuran, polypyrrole, polymethylpyrrole, and substitution derivatives and copolymers thereof.

9. The solid electrolyte capacitor as claimed in claim 4, wherein the inorganic semiconductor is at least one compound selected from the group consisting of molybdenum dioxide, tungsten dioxide, lead dioxide and manganese dioxide.

10. The solid electrolyte capacitor as claimed in claim 4, wherein the electrical conductivity of the semiconductor is from $10^{-2}$ to $10^3$ S/cm.

11. An electronic circuit using the solid electrolyte capacitor described in claim 1.

12. An electronic device using the solid electrolyte capacitor described in claim 1.

13. The solid electrolyte capacitor as claimed in claim 1, wherein the semiconductor layer is formed on a face of the sintered body on which the anode lead is implanted, said semiconductor layer being tapered to form a slope from an edge of the face toward the anode lead-connection point.

* * * * *